Aug. 5, 1924.

W. BACHMANN

WOOD AND LIKE FASTENING

Filed Dec. 30, 1922

1,503,622

Inventor:
Wilhelm Bachmann

Patented Aug. 5, 1924.

1,503,622

UNITED STATES PATENT OFFICE.

WILHELM BACHMANN, OF ZURICH, SWITZERLAND.

WOOD AND LIKE FASTENING.

Application filed December 30, 1922. Serial No. 610,010.

*To all whom it may concern:*

Be it known that I, WILHELM BACHMANN, a citizen of the Swiss Republic, residing at Zurich, Switzerland, have invented certain Improvements in Wood and like Fastenings, of which the following is a specification.

This invention relates to a device for connecting pieces of wood or the like in various relative positions, and consists in the provision of a right-angle bracket having screw-holes in its members, one member being also furnished with a flange which projects at right angles so that it can be accommodated in a circular recess in the wood for strengthening the connection of the bracket to the latter. Two brackets may be used together for fastening two pieces edge to edge, in which case the projecting members of the two brackets are connected by means of a clamp-screw. When one member is to be connected at an angle to another, only one bracket is used in conjunction with a screw-plate connected to one of the members.

Fig. 1 of the drawings represents a plan of two pieces of wood connected edge to edge by means of two brackets, and Fig. 2, a vertical section of the arrangement taken on the line A—A of Fig. 1.

The device is composed of a bracket $r$ having two members $c$ and $e$ set at right angles to one another. One member, which is connected to the wood, has an aperture for the admission of a screw $n$, and centered about this aperture is a circuit flange $l$ which projects at right angles so that it can be accommodated in a circular recess $m$ made in the wood. By this arrangement the bracket will be firmly seated in the wood, and the screw will be relieved of the transverse stress. The projecting member $e$ of the bracket has also an aperture $g$ for admitting a clamp-screw $h$, and the rigidity of the bracket is ensured by the provision of lateral reinforcing ribs $d$.

Figure 1:
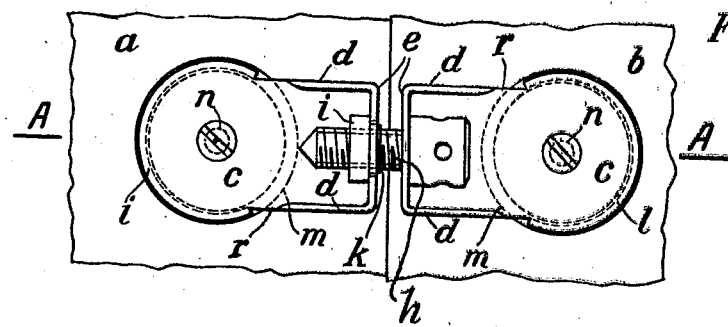
Figure 2:
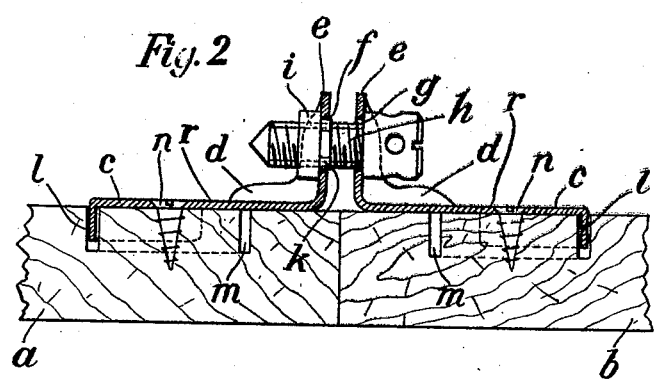

When two wood elements such as $a$ and $b$ are to be connected edge to edge, as shown in Figs. 1 and 2, one bracket is applied to each element, and the projecting members $e$ are used for clamping the two elements together. For this purpise a nut $i$ is employed together with the screw $h$. The bracket which is engaged by the nut may have an angular aperture $f$ in which to accommodate a correspondingly shaped projecting portion $k$ on the nut so as to prevent the latter from participating in the rotation of the screw.

Figure 3:
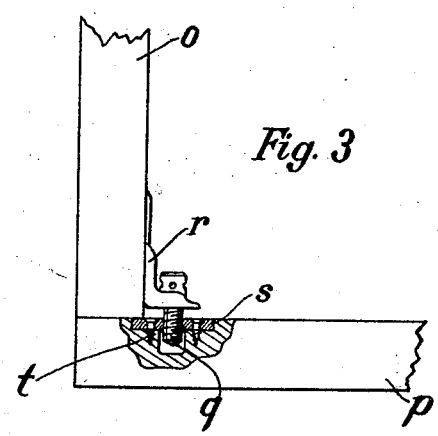
Fig. 3 is a view, partly in section, showing two pieces connected at right angles to one another by means of the device.
Figure 4:
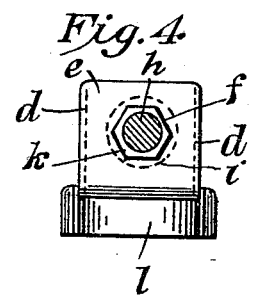
Fig. 4 is a side elevation of one of the brackets showing the connecting screw in section.

When elements such as $o$ and $p$ (Fig. 3) are to be connected at an angle, one bracket $r$ such as described, is connected to the element whose end is to abut against the face of the opposite element. To the latter element a plate $s$, or its equivalent, is connected by means of screws $t$, and a clamp-screw $q$ is passed through the projecting member of the bracket and screwed into the plate $s$. If the elements $o$ and $p$ should have to be connected at an angle other than a right one, the screw-hole in the plate $s$ must be drilled obliquely.

The recess $m$ in the wood is easily made by means of a center drill and does not materially weaken the wood.

I claim:

1. A device for fastening wood and like elements together, comprising a right-angle bracket having a screw-hole in each of its members, and a segmental flange formed on one member at right angles and concentrically with the screw hole in said member so that it can be accommodated in a circular recess in the wood for strengthening the connection of the bracket to the latter.

2. A device for fastening wood and like elements together, comprising a right-angle bracket having a screw-hole in each of its members, a segmental flange formed on one member at right angles and concentrically with the screw hole in said member so that it can be accommodated in a circular recess in the wood for strengthening the connection of the bracket to the latter, and a clamp screw for connecting the other member of the bracket to a corresponding fastening element attached to a different piece of material.

3. A device for fastening wood and like elements together, comprising a right-angle bracket having a screw-hole in each of its members, a segmental flange formed on one member at right angles and concentrically with the screw hole in said member so that it can be accommodated in a circular recess in the wood for strengthening the connection of the bracket to the latter, a screw-plate secured to different pieces of material, and a clamp screw for connecting said screw plate with the projecting member of the bracket.

WILHELM BACHMANN.